(No Model.)
N. NEWMAN.
AUTOMATIC SWITCH.
No. 487,881. Patented Dec. 13, 1892.
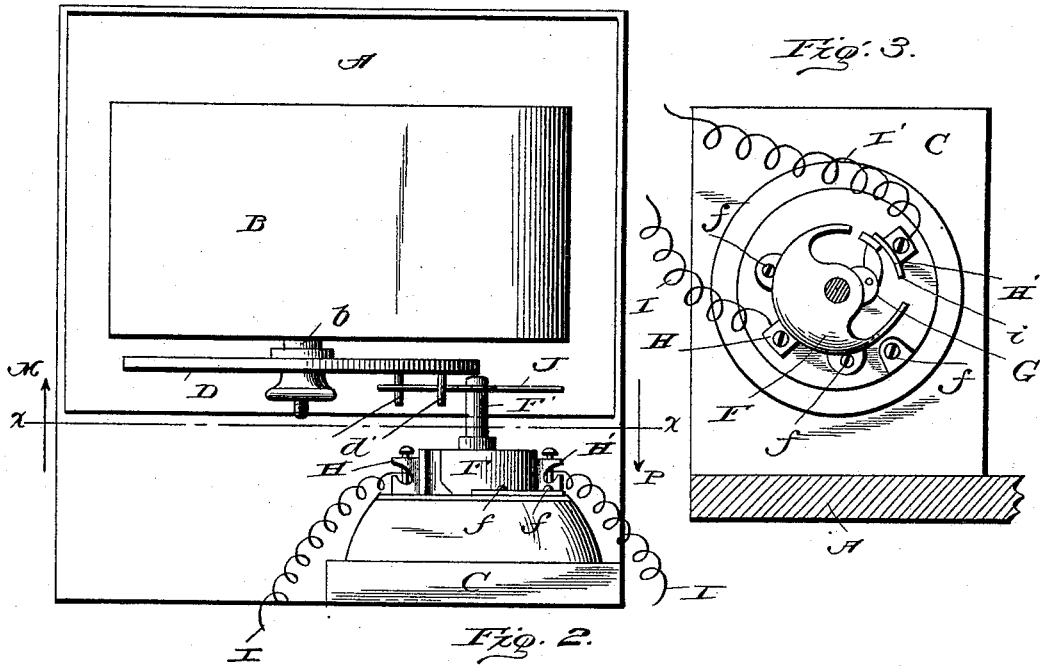
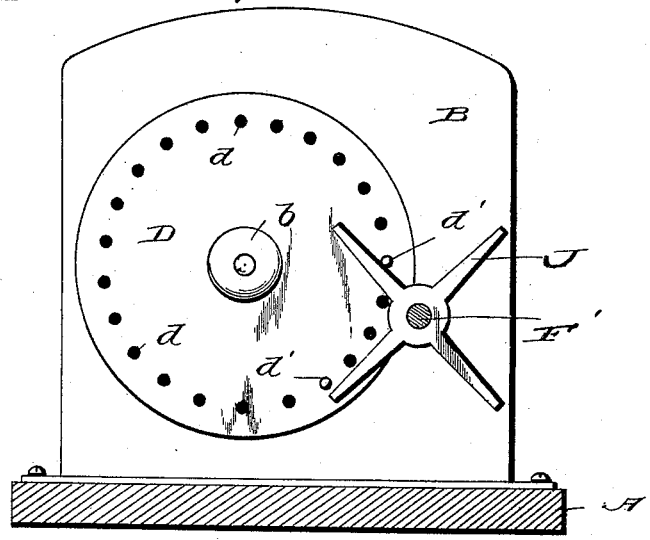
Witnesses:
Inventor
Nelson Newman
By H. D. Money
Atty.

UNITED STATES PATENT OFFICE.

NELSON NEWMAN, OF SPRINGFIELD, ILLINOIS, ASSIGNOR OF TWO-THIRDS TO SAMUEL J. WILLETT AND GEORGE A. SANDERS, OF SAME PLACE.

AUTOMATIC SWITCH.

SPECIFICATION forming part of Letters Patent No. 487,881, dated December 13, 1892.

Application filed August 2, 1892. Serial No. 441,982. (No model.)

*To all whom it may concern:*

Be it known that I, NELSON NEWMAN, a citizen of the United States, and a resident of the city of Springfield, in the county of Sangamon and State of Illinois, have invented certain new and useful Improvements in Automatic Electric-Light Meters and Switch-Turners, of which the following is a full, clear, and exact specification.

The present invention is an automatic switch for use in electrical appliances for producing either light, heat, or power; and it relates more particularly to means for automatically closing or breaking an electric circuit at certain predetermined or regulated intervals of time, which means is especially desirable in electric gas lighting and extinguishing systems forming the subject-matter of my prior patents, Nos. 417,075 and 417,198, dated December 10, 1889.

The invention consists in the combination, with a revoluble disk or dial carrying a series (two or more) of adjustable stops or pins and adapted to be rotated by any suitable form of prime moving mechanism—as clockwork, for instance—of a switch having the two circuit-conductors connected thereto and provided with a spindle or shaft which is electrically connected thereto, so as to turn or rotate freely, an arm carried by said spindle and adapted to make contact with one of the contacts of the switch, and a tappet-wheel also carried by the spindle or shaft and arranged thereon so that one of its arms is adapted to lie in the path of the stops or pins of the revoluble dial or disk, whereby the latter is made to turn the tappet-wheel and spindle to open and close the circuit at the desired time.

The invention further consists in the combination of devices and construction and arrangement of parts, which will be hereinafter fully described, and particularly pointed out in the claims.

The accompanying drawings, forming a part of this specification, fully illustrate my invention, and in which—

Figure 1 is a plan view showing the electric switch arranged for operation in connection with clockwork. Fig. 2 is a sectional view on the line $x\ x$ of Fig. 1, looking in the direction indicated by the arrow M and showing the dial or disk and the tappet-wheel. Fig. 3 is a similar section on the same line $x\ x$, but looking in the reverse direction, indicated by the arrow P of Fig. 1.

Like letters of reference denote corresponding parts in the several figures of the drawings, referring to which—

A designates a suitable base on which the switch and the parts associated therewith are mounted. This base is made of non-conducting or insulating material—wood, for instance—and it contains the standard C for the electric switch F and the casing B, in which is arranged the clockwork (not shown) that constitutes the motor for revolving the dial or disk D. This dial or disk is carried on the outer protruding end of the shaft $b$, that is adapted to be driven by the motor contained within the fixed casing B, and said dial or disk is provided with a series of transverse holes or openings $d$, arranged near its periphery. In these holes are adapted to be fitted a series of stops or pins $d'\ d'$, any number of which may be employed and which may be arranged at any suitable distances apart on said dial or disk.

The standard C is rigidly secured to the base A at one side of the dial or disk D, and to the inner side of this standard is rigidly secured the switch F—as, for instance, by means of the screws $f$, which pass through lugs integral with the switch. This switch is of the ordinary construction, except that its spindle or shaft F' extends inward toward the dial or disk D, but does not contact therewith. The spindle or shaft F' is electrically connected to the switch to rotate freely therein, and said spindle carries an outwardly-extending arm G, which is adapted to make contact with one of the contact-plates of the switch.

H H' are the binding-posts, mounted on the standards C, and to these posts are connected the wires or conductors I I' of the electric circuit which includes the appliances for producing light, heat, or power. The post H is in electrical connection with the switch F, as shown in Fig. 3; but the post H' has a contact $i$, with which the arm G of the spindle is adapted to make contact to close the circuit through the switch.

J is the tappet-wheel, consisting of a hub and a series of radial arms, as indicated more clearly in Fig. 2 of the drawings, and this tappet-wheel is rigidly secured on the inner end of the spindle or shaft F' of the switch. The wheel J is placed so that one of its arms is always in the path of one of the pins or stops on the dial or disk D, and as said disk is rotated or driven by the motor the pins thereon come in contact with one of the arms of the tappet to turn or rotate the same and the spindle to which the tappet is secured, whereby the spindle is caused to bring its arm G into or out of engagement with the contact $i$ of the switch. The binding-post H is in electrical contact with the swith F, while the binding-post H' is insulated by the standard C from the post H and the switch F. The spindle F' is in electrical contact with the switch F, and the arm G is in electrical contact with the spindle, while the tappet-wheel J is insulated from the spindle, and the rest of the mechanism is insulated from the switch in any suitable way, so that the current will pass through the post H, the switch F, its spindle, the arm G, and the post H' when the circuit is closed by the arm G making contact with the contact $i$ of the post H'.

The operation of my invention is obvious, but may be briefly described as follows: The stops or pins $d'$ are placed in the holes of the disk at the proper intervals apart to operate the switch, and the dial is caused to rotate to cause the pins to impinge successively against the arms of the tappet-wheel, thus turning the spindle and bringing the arm G in engagement with the contact $i$ of the switch, thereby closing the circuit through the switch and permitting the current to flow through the conductors to operate the devices included in the circuit. If the mechanism is to be used to operate the gas lighting and extinguishing devices of my prior patents hereinbefore referred to, the pins or stops are placed quite near each other, as in Fig. 2, so that one pin is adapted to operate the tappet-wheel and close the circuit to permit the current to actuate the devices to ignite the gas-jet, while the other pin is adapted to operate the tappet-wheel to break the circuit, and thus save the energy or power of the battery. I do not, however, restrict myself to the use of my improvements in a gas lighting and extinguishing system, as I am aware that the same can be used in other systems and relations to automatically open and close the circuit; nor do I limit myself to the exact details of construction of the mechanism herein shown and described as an embodiment of my invention, as it is evident that changes therein can be made by the skilled mechanic without departing from the spirit of my invention.

Having thus fully described my invention, what I claim as new, and desire to secure by Letters Patent, is—

1. The combination, with a suitable motor, of a revoluble dial or disk carrying the pins or stops and a switch provided with a rotating spindle and a tappet carried by the spindle and arranged in the path of the stops or pins on the dial, as and for the purpose described.

2. The combination, with a suitable motor, of a revoluble dial or disk provided with a series of adjustable stops or pins, a switch having the contact $i$ and the conductors connected thereto, the spindle in electrical connection with the switch and having means adapted to make the contact $i$, and the tappet carried by the spindle and arranged in the path of the pins or stops, as and for the purpose described.

3. The combination, with a suitable motor, of the perforated revoluble dial or disk having the adjustable stops or pins, the switch provided with the contact $i$ and having the circuit-conductors connected thereto, the spindle in electrical connection with the switch, the arm rigid with the spindle and adapted to make the contact $i$, and the tappet-wheel carried by the inner end of the spindle and arranged in the path of the stops or pins on the dial, as and for the purpose described.

In testimony whereof I hereunto set my hand in the presence of two witnesses.

NELSON NEWMAN.

Witnesses:
WM. R. BOWERS,
MARY C. MCCLURE.